United States Patent
Poulos et al.

(10) Patent No.: US 9,245,387 B2
(45) Date of Patent: Jan. 26, 2016

(54) HOLOGRAPHIC SNAP GRID

(71) Applicant: MICROSOFT TECHNOLOGY LICENSING, LLC, Redmond, WA (US)

(72) Inventors: Adam G. Poulos, Redmond, WA (US); Jason Scott, Kirkland, WA (US); Matthew Kaplan, Seattle, WA (US); Christopher Obeso, Seattle, WA (US); Cameron G. Brown, Redmond, WA (US); Daniel J. McCulloch, Kirkland, WA (US); Abby Lee, Seattle, WA (US); Brian J. Mount, Seattle, WA (US); Ben J. Sugden, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 207 days.

(21) Appl. No.: 13/862,347

(22) Filed: Apr. 12, 2013

(65) Prior Publication Data
US 2014/0306993 A1    Oct. 16, 2014

(51) Int. Cl.
*G06T 19/00* (2011.01)
*G09G 5/00* (2006.01)

(52) U.S. Cl.
CPC .................... *G06T 19/006* (2013.01)

(58) Field of Classification Search
CPC .............................. G06T 19/00; G06T 19/006
USPC ........................................................ 345/633
See application file for complete search history.

(56) References Cited

U.S. PATENT DOCUMENTS

| 5,912,700 A | 6/1999 | Honey et al. |
| 7,324,085 B2 | 1/2008 | Balakrishnan et al. |
| 2005/0052714 A1 | 3/2005 | Klug et al. |
| 2005/0062684 A1 | 3/2005 | Geng |
| 2005/0068290 A1* | 3/2005 | Jaeger ................ G06F 3/04845 345/156 |
| 2006/0195809 A1* | 8/2006 | Cohn ................... G06F 17/5068 716/53 |

(Continued)

OTHER PUBLICATIONS

TurboCAD, TurboCad Community: Snap tools 2012, retrieved from "http://www3.turbocadcommunity.com/tiki-index.php?page=Snaps#Grid_Snap" Accessed Jan. 9, 2014.*

(Continued)

*Primary Examiner* — Xiao Wu
*Assistant Examiner* — Michael J Cobb
(74) *Attorney, Agent, or Firm* — Dan Choi; Judy Yee; Micky Minhas

(57) ABSTRACT

Methods for positioning virtual objects within an augmented reality environment using snap grid spaces associated with real-world environments, real-world objects, and/or virtual objects within the augmented reality environment are described. A snap grid space may comprise a two-dimensional or three-dimensional virtual space within an augmented reality environment in which one or more virtual objects may be positioned. In some embodiments, a head-mounted display device (HMD) may identify one or more grid spaces within an augmented reality environment, detect a positioning of a virtual object within the augmented reality environment, determine a target grid space of the one or more grid spaces in which to position the virtual object, determine a position of the virtual object within the target grid space, and display the virtual object within the augmented reality environment based on the position of the virtual object within the target grid space.

17 Claims, 12 Drawing Sheets

(56) References Cited

U.S. PATENT DOCUMENTS

| | | | |
|---|---|---|---|
| 2008/0288220 | A1 | 11/2008 | Dillenberger et al. |
| 2010/0020101 | A1* | 1/2010 | Schormann .................. 345/654 |
| 2010/0060788 | A1* | 3/2010 | Blackburn .......... H04N 5/4401 |
| | | | 348/563 |
| 2010/0149611 | A1 | 6/2010 | Leister |
| 2011/0043517 | A1 | 2/2011 | Schneider et al. |
| 2012/0092369 | A1* | 4/2012 | Kim et al. .................... 345/633 |
| 2012/0250940 | A1* | 10/2012 | Kasahara ..................... 382/103 |
| 2013/0005458 | A1* | 1/2013 | Kosta et al. .................... 463/31 |

OTHER PUBLICATIONS

Autodesk, Autodesk Exchange, 2011, retrieved from "http://exchange.autodesk.com/autocadlt/enu/online-help/browse#WS1a9193826455f5ffa23ce210c4a30acaf-7114.htm" Accessed Jan. 9, 2014.*

Hannes Kaufmann, Dieter Schmalstieg, Designing Immersive Virtual Reality for Geometry Education, 2006, IEEE Virtual Reality Conference VR'06, 1087-8270/06.*

Patrick Baudisch, The Cage: Efficient Construction in 3D using a Cubic Adaptive Grid, 1996, Proceedings of the 9th Annual ACM symposium on user interface software and technology UIST '96, pp. 171-172.*

George W. Furnas, Xiaolong Zhang, MuSE: a multiscale editor, Proceedings of the 11th annual ACM symposium on User interface software and technology UIST '98, pp. 107-116.*

Eric A. Bier, Snap-Dragging in Three Dimensions, 1990, I3D '90 Proceedings of the 1990 symposium on Interactive 3D graphics, pp. 193-204.*

"International Search Report & Written Opinion for PCT Patent Application No. PCT/US2014/033406", Mailed Date: Aug. 1, 2014, Filed Date: Apr. 9, 2014, 10 pp.. (MS# 337634.02).

Hoang, et al., "Augmented Viewport: Towards Precise Manipulation at a Distance for Outdoor Augmented Reality Wearable Computers", In Book—Recent Trends of Mobile Collaborative Augmented Reality Systems, Aug. 4, 2011, 14 Pages.

Shen, et al., "Augmented Reality for Collaborative Product Design and Development", In Journal of Design Studies, vol. 31, Issue 2, Mar. 2010, pp. 118-145.

Lee, et al., "Snap-to-Feature Interface for Annotation in Mobile Augmented Reality", In Workshop on Augmented Reality Super Models at ISMAR, 2010, 4 Pages.

Tsysar, et al., "Ultrasonic Holography of 3D Objects", In Proceedings of IEEE International Ultrasonics Symposium, Sep. 20, 2009, 4 pages.

Deering, Michael F., "HoloSketch: A Virtual Reality Sketching/Animation Tool", In Proceedings of ACM Transactions on Computer-Human Interaction, vol. 2, Issue 3, Sep. 1995, 19 pages.

Lee, et al., "ZeroN: Mid-Air Tangible Interaction Enabled by Computer Controlled Magnetic Levitation", In Proceedings of 24th Annual ACM Symposium on User Interface Software and Technology, Oct. 16, 2011, 10 pages.

Response to International Search Report and Written Opinion dated Dec. 1, 2014, PCT Patent Application No. PCT/US2014/033406.

"Written Opinion Issued in PCT Application No. PCT/US2014/033406", Mailed Date: Mar. 16, 2015, 7 Pages. (MS# 337634.02).

"International Preliminary Report on Patentability Issued in PCT Application No. PCT/US2014/033406", Mailed Date: May 12, 2015, 8 Pages. (MS# 337634.02).

* cited by examiner

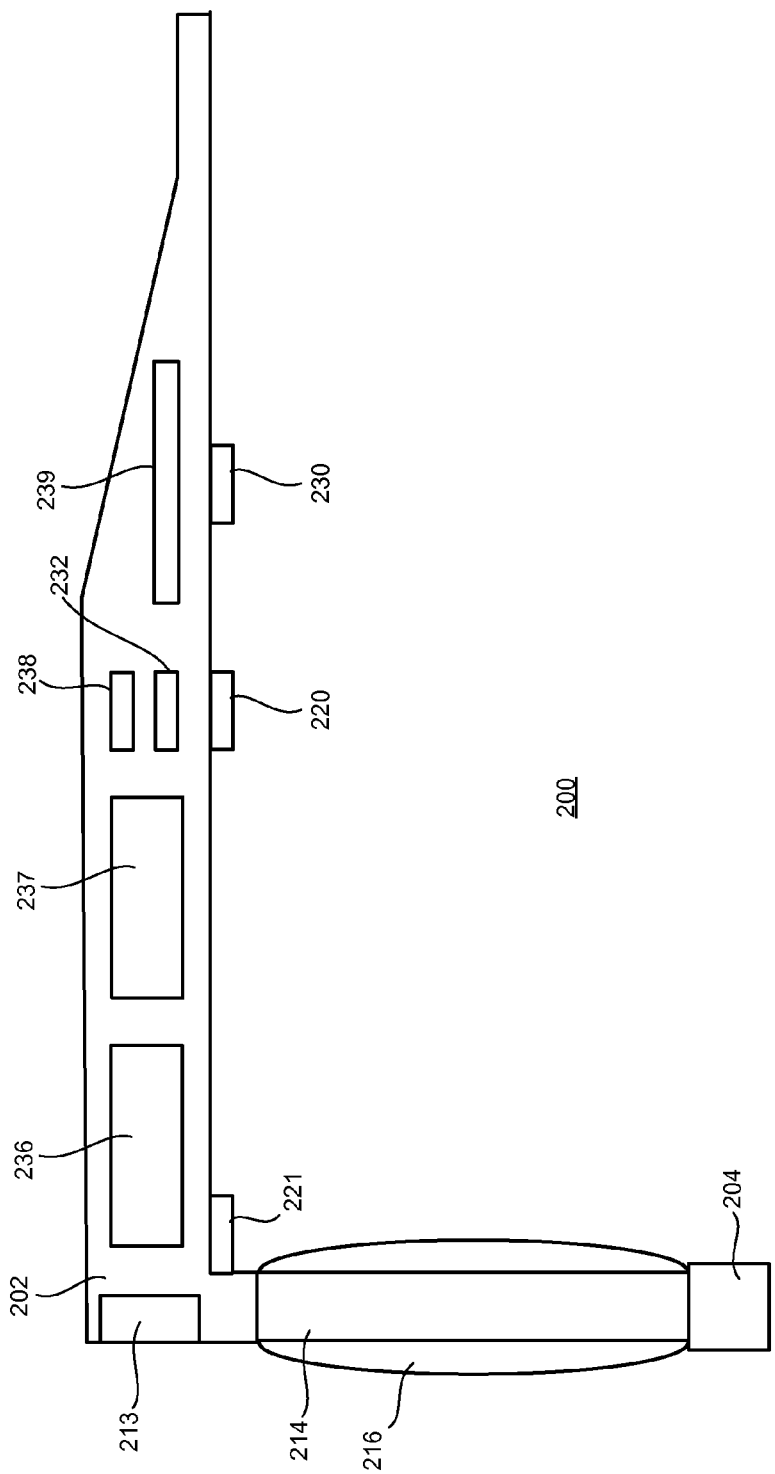

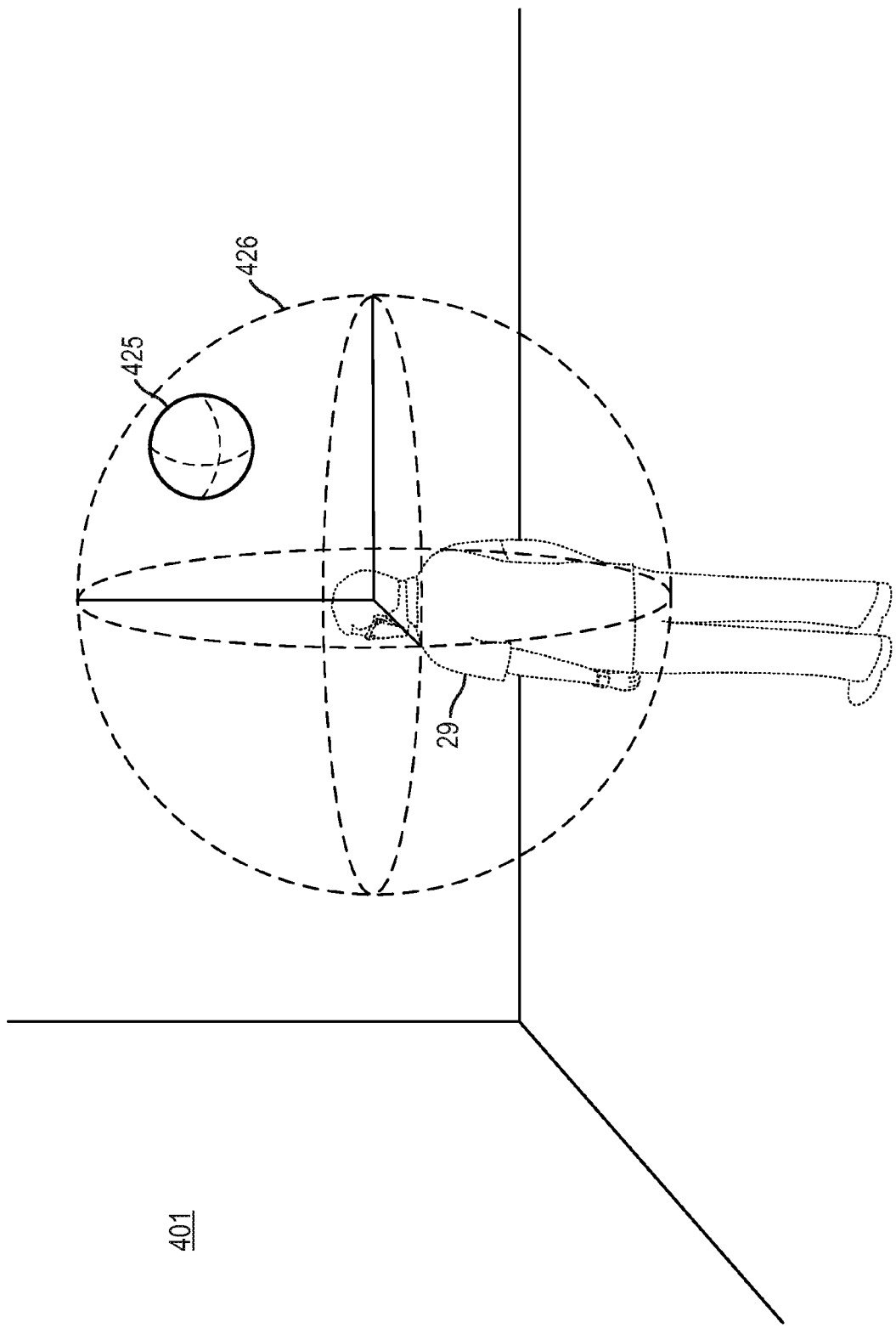

HOLOGRAPHIC SNAP GRID

BACKGROUND

Augmented reality (AR) relates to providing an augmented real-world environment where the perception of a real-world environment (or data representing a real-world environment) is augmented or modified with computer-generated virtual data. For example, data representing a real-world environment may be captured in real-time using sensory input devices such as a camera or microphone and augmented with computer-generated virtual data including virtual images and virtual sounds. The virtual data may also include information related to the real-world environment such as a text description associated with a real-world object in the real-world environment. The objects within an AR environment may include real objects (i.e., objects that exist within a particular real-world environment) and virtual objects (i.e., objects that do not exist within the particular real-world environment).

In order to realistically integrate virtual objects into an AR environment, an AR system typically performs several tasks including mapping and localization. Mapping relates to the process of generating a map of a real-world environment. Localization relates to the process of locating a particular point of view or pose relative to the map of the real-world environment. In some cases, an AR system may localize the pose of a mobile device moving within a real-world environment in real-time in order to determine the particular view associated with the mobile device that needs to be augmented as the mobile device moves within the real-world environment.

SUMMARY

Technology is described for positioning virtual objects within an augmented reality environment using snap grid spaces associated with real-world environments, real-world objects, and/or virtual objects within the augmented reality environment. A snap grid space may comprise a two-dimensional or three-dimensional virtual space within an augmented reality environment in which one or more virtual objects may be positioned. In some embodiments, a head-mounted display device (HMD) may identify one or more grid spaces within an augmented reality environment, detect a positioning of a virtual object within the augmented reality environment, determine a target grid space of the one or more grid spaces in which to position the virtual object, determine a position of the virtual object within the target grid space, and display the virtual object within the augmented reality environment based on the position of the virtual object within the target grid space.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2B depicts one embodiment of a portion of an HMD.

FIG. 4D depicts one embodiment of an augmented reality environment including a first person and a radial snap grid space that is positioned relative to the first person.

DETAILED DESCRIPTION

Figure 1:
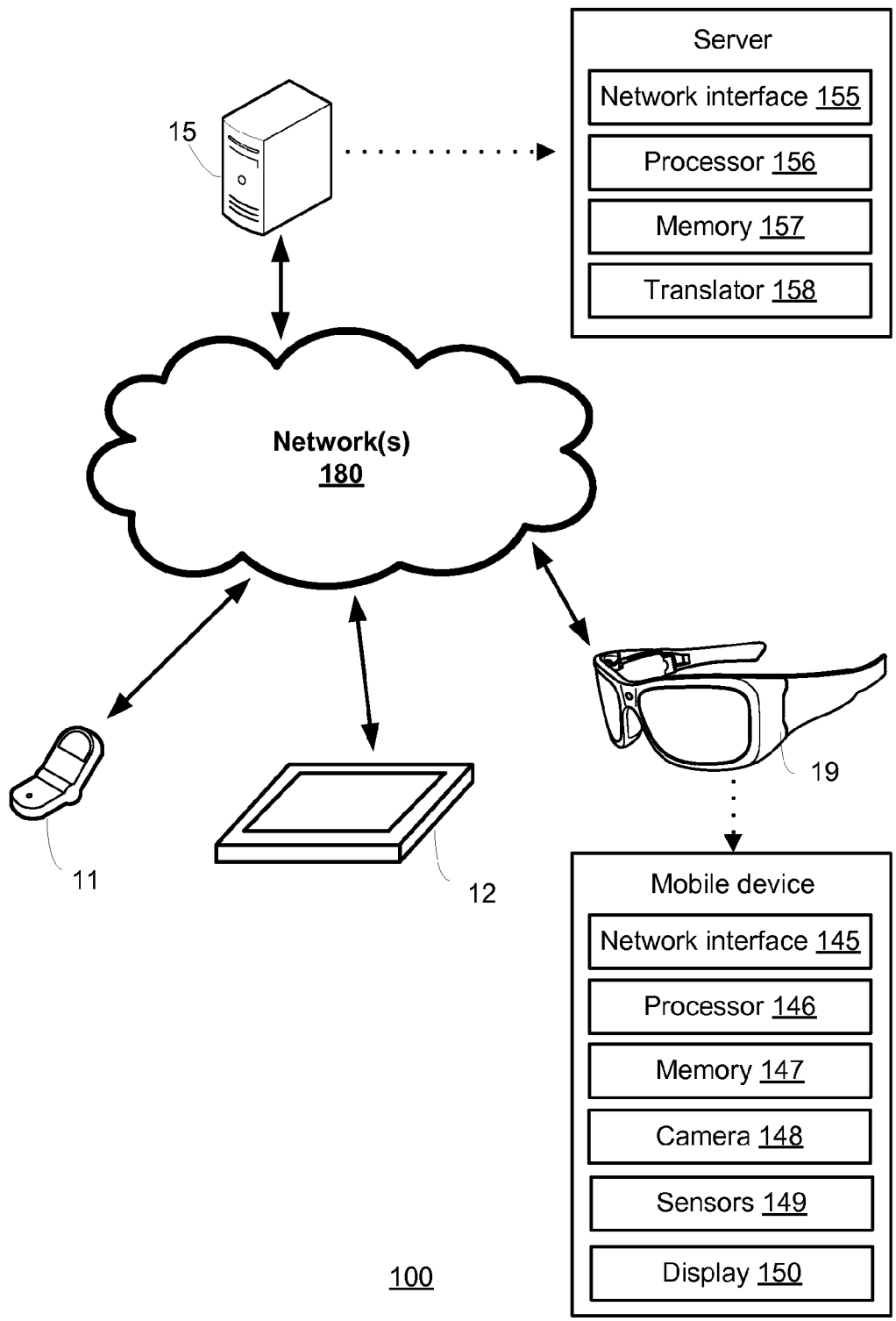
FIG. 1 is a block diagram of one embodiment of a networked computing environment in which the disclosed technology may be practiced.

Technology is described for positioning virtual objects within an augmented reality environment using snap grid spaces associated with real-world environments, real-world objects, and/or virtual objects within the augmented reality environment. A snap grid space may comprise a two-dimensional or three-dimensional virtual space within an augmented reality environment in which one or more virtual objects may be positioned. The snap grid space may be associated with a particular room or environment (e.g., a living room or office). The snap grid space may be associated with a real-world object (e.g., a portion of a wall within a room or a tabletop surface) or a virtual object (e.g., a moveable virtual bulletin board or virtual tabletop). In some embodiments, a mobile device, such as a head-mounted display device (HMD), may identify one or more grid spaces within an augmented reality environment, detect a positioning (or re-positioning) of a virtual object within the augmented reality environment, determine a target grid space of the one or more grid spaces in which to position the virtual object, determine a grid spacing associated with the target grid space, determine a position and an orientation of the virtual object within the target grid space based on the grid spacing, and display the virtual object within the augmented reality environment based on the position and the orientation of the virtual object within the target grid space.

In some embodiments, a virtual object (e.g., a holographic TV, a holographic web browser, or a holographic painting) may be positioned within an augmented reality environment and then automatically snapped to a grid location corresponding with a snap grid space within the augmented reality environment. In some cases, the snap grid space may be associated with a real-world environment (e.g., an office or a bedroom) and the virtual object may be positioned within the top-level world space associated with the real-world environment. In some cases, the snap grid space may be associated with a real-world object (e.g., a desk or wall) within an augmented reality environment and the virtual object may be positioned relative to the real-world object or a 3D model of the real-world object. In this case, as the real-world object moves within the augmented reality environment, the virtual object will move with the real-world object. In one example, the real-world object may comprise a person and the virtual object may be positioned relative to the person (e.g., the virtual object may be positioned within a radial snap grid space that moves relative to the person). The person may comprise an end user of an HMD or a particular person within the augmented reality environment. In some cases, the snap grid space may be associated with a second virtual object (e.g., a virtual desk or a virtual wall) within an augmented reality environment and the virtual object may be positioned relative to the second virtual object. In this case, as the second virtual object moves within the augmented reality environment, the virtual object will move with (or relative to) the second virtual object.

In some embodiments, a virtual object within a snap grid space may be automatically snapped to the closest (or nearest) grid point within the snap grid space upon the detection of a positioning event (e.g., after being positioned and released by an end user of an HMD). A positioning event may be triggered, for example, if an end user of an HMD performs a virtual object copy-and-paste function, a virtual object cut-and-paste function, or a virtual object move function. In some cases, the virtual object may snap its position and orientation relative to a set of grid points (or anchor points) within the snap grid space. The grid spacing (or density of grid points) associated with the snap grid space may be determined based on applications running on the HMD (e.g., a virtual TV viewing application or a virtual web browser application) and/or the size of the virtual object relative to the size of the snap grid space (e.g., a smaller virtual object may require a higher grid spacing density as compared with a larger virtual object). The grid spacing may also be set based on the size of other virtual objects that have already been positioned within (or relative to) the snap grid space. In some cases, the grid spacing may be non-uniform within regions of the snap grid space (e.g., denser grid points may be provided near corners or edges of the grid space or within regions of the grid space in which positioning of virtual objects is more likely to occur).

In some embodiments, a snap grid space may comprise an adjustable and/or moveable virtual space. For example, a snap grid space that is attached to a work desk in a work environment may be relocated or moved (e.g., grabbed and dragged by an end user) to a different desk in the work environment or a wall within the work environment. In another example, the snap grid space may be cut from a portion of a wall within a first apartment and pasted to a portion of a wall within a second apartment (e.g., after moving from the first apartment to the second apartment). In some cases, the snap grid space and its grid spacing may be resized or adjusted (e.g., enlarged or shrunk by an end user of an HMD viewing the augmented reality environment) in order to fit within the dimensions of an anchoring real-world object and/or virtual object.

One issue with placing and/or arranging virtual objects within a three-dimensional augmented reality environment using an HMD is that accurate positioning may be difficult due to the single reference point of view provided by the HMD. Moreover, drifting of virtual object positions over time within an augmented reality environment may compromise the augmented reality experience by breaking the illusion of the virtual objects within the augmented reality environment. Thus, there is a need to improve the positioning of virtual objects within an augmented reality environment.

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 11, mobile device 12, mobile device 19, and server 15. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

Server 15, which may comprise a supplemental information server or an application server, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 15 includes a network interface 155, processor 156, memory 157, and translator 158, all in communication with each other. Network interface 155 allows server 15 to connect to one or more networks 180. Network interface 155 may include a wireless network interface, a modem, and/or a wired network interface. Processor 156 allows server 15 to execute computer readable instructions stored in memory 157 in order to perform processes discussed herein. Translator 158 may include mapping logic for translating a first file of a first file format into a corresponding second file of a second file format (i.e., the second file may be a translated version of the first file). Translator 158 may be configured using file mapping instructions that provide instructions for mapping files of a first file format (or portions thereof) into corresponding files of a second file format.

One embodiment of mobile device 19 includes a network interface 145, processor 146, memory 147, camera 148, sensors 149, and display 150, all in communication with each other. Network interface 145 allows mobile device 19 to connect to one or more networks 180. Network interface 145 may include a wireless network interface, a modem, and/or a wired network interface. Processor 146 allows mobile device 19 to execute computer readable instructions stored in memory 147 in order to perform processes discussed herein. Camera 148 may capture color images and/or depth images. Sensors 149 may generate motion and/or orientation information associated with mobile device 19. In some cases, sensors 149 may comprise an inertial measurement unit (IMU). Display 150 may display digital images and/or videos. Display 150 may comprise a see-through display.

In some embodiments, various components of mobile device 19 including the network interface 145, processor 146, memory 147, camera 148, and sensors 149 may be integrated on a single chip substrate. In one example, the network interface 145, processor 146, memory 147, camera 148, and sensors 149 may be integrated as a system on a chip (SOC). In other embodiments, the network interface 145, processor 146, memory 147, camera 148, and sensors 149 may be integrated within a single package.

In some embodiments, mobile device 19 may provide a natural user interface (NUI) by employing camera 148, sensors 149, and gesture recognition software running on processor 146. With a natural user interface, a person's body parts and movements may be detected, interpreted, and used to control various aspects of a computing application. In one example, a computing device utilizing a natural user interface may infer the intent of a person interacting with the computing device (e.g., that the end user has performed a particular gesture in order to control the computing device).

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In one example, mobile device 19 comprises a head-mounted display device (HMD) that provides an augmented reality environment or a mixed reality environment to an end user of the HMD (e.g., for controlling applications running on the HMD). The HMD may comprise a video see-through and/or an optical see-through system. An optical see-through HMD worn by an end user may allow actual direct viewing of a real-world environment (e.g., via transparent lenses) and may, at the same time, project images of a virtual object into the visual field of the end user thereby augmenting the real-world environment perceived by the end user with the virtual object.

Utilizing an HMD, an end user may move around a real-world environment (e.g., a living room) wearing the HMD and perceive views of the real-world overlaid with images of virtual objects. The virtual objects may appear to maintain coherent spatial relationship with the real-world environment (i.e., as the end user turns their head or moves within the real-world environment, the images displayed to the end user will change such that the virtual objects appear to exist within the real-world environment as perceived by the end user). The virtual objects may also appear fixed with respect to the end user's point of view (e.g., a virtual menu that always appears in the top right corner of the end user's point of view regardless of how the end user turns their head or moves within the real-world environment). In one embodiment, environmental mapping of the real-world environment may be performed by server 15 (i.e., on the server side) while camera localization may be performed on mobile device 19 (i.e., on the client side). The virtual objects may include a text description associated with a real-world object.

In some embodiments, a mobile device, such as mobile device 19, may be in communication with a server in the cloud, such as server 15, and may provide to the server location information (e.g., the location of the mobile device via GPS coordinates) and/or image information (e.g., information regarding objects detected within a field of view of the mobile device) associated with the mobile device. In response, the server may transmit to the mobile device one or more virtual objects based upon the location information and/or image information provided to the server. In one embodiment, the one or more virtual objects may be manipulated or controlled by an end user of the mobile device using hand and/or finger gestures.

In some embodiments, an end user of a mobile device may position (or reposition) a virtual object within an augmented reality environment by selecting the virtual object and moving the virtual object into a region of the augmented reality environment associated with a snap grid space. The snap grid space may be associated with a corresponding real-world environment (e.g., the snap grid space may comprise a three-dimensional snap grid space located within a portion of a bedroom), real-world objects (e.g., the snap grid space may comprise a three-dimensional space located above a table), and/or virtual objects (e.g., the snap grid space may comprise a two-dimensional space located on the surface of a virtual table) within the augmented reality environment. The snap grid space may be highlighted (e.g., a virtual wireframe mesh or virtual point grid of snap points may be used to highlight the grid space) to help identify the snap grid space to the end user during positioning of the virtual object within the augmented reality environment. Once the virtual object has been positioned (e.g., by being moved and released by the end user) relative to a snap grid space, the virtual object may be automatically snapped to the closest grid point within the snap grid space.

In some embodiments, the snap grid space itself may comprise an adjustable and/or moveable virtual space. For example, a two-dimensional snap grid space associated with a virtual bulletin board that is located on a wall within a first home environment may be moved (or relocated) to a different wall within the home environment or a different home environment. In this case, although the snap grid space has been relocated, virtual objects that have been snapped to various grid points within the snap grid space would maintain their positions relative to the snap grid space.

Figure 2A:
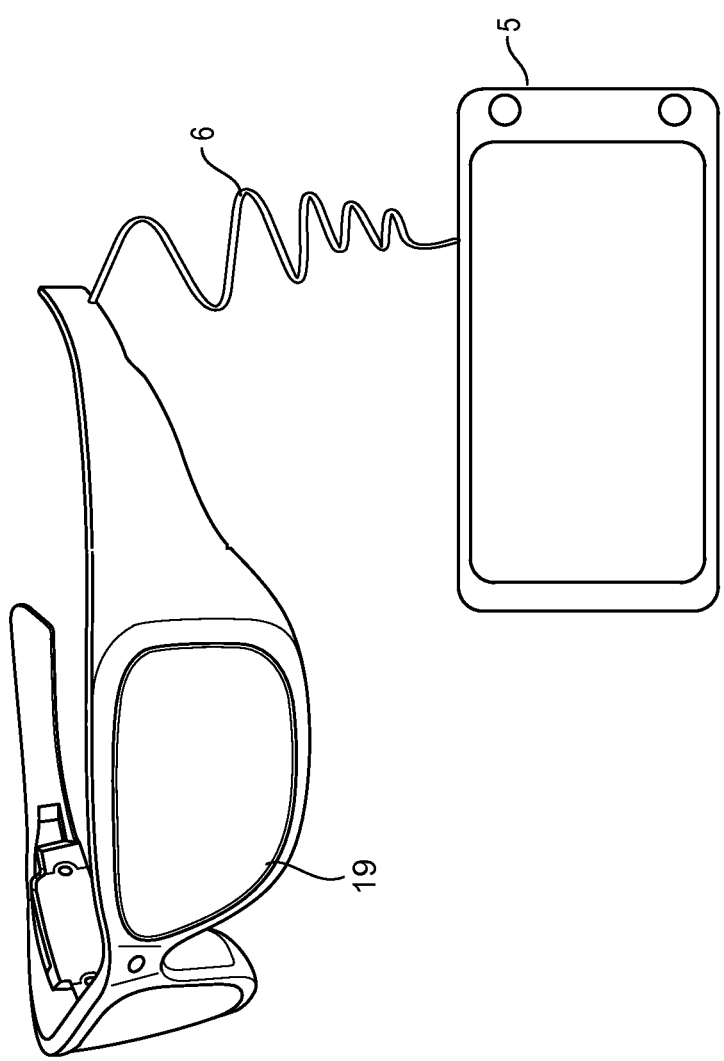
FIG. 2A depicts one embodiment of a mobile device in communication with a second mobile device.

FIG. 2A depicts one embodiment of a mobile device 19 in communication with a second mobile device 5. Mobile device 19 may comprise a see-through HMD. As depicted, mobile device 19 communicates with mobile device 5 via a wired connection 6. However, the mobile device 19 may also communicate with mobile device 5 via a wireless connection. In one example, an HMD worn by an end user of the HMD may wirelessly communicate with a second mobile device (e.g., a mobile phone used by the end user) within a proximity of the end user (e.g., the second mobile device may be in a coat pocket). Mobile device 5 may be used by mobile device 19 in order to offload compute intensive processing tasks (e.g., the rendering of virtual objects and/or the recognition of gestures) and to store information (e.g., models of virtual objects) that may be used to provide an augmented reality environment on mobile device 19 (e.g., used by the end user for controlling applications running on the mobile device). Mobile device 19 may provide motion and/or orientation information associated with mobile device 19 to mobile device 5. In one example, the motion information may include a velocity or acceleration associated with the mobile device 19 and the orientation information may include Euler angles, which provide rotational information around a particular coordinate system or frame of reference. In some cases, mobile device 19 may include a motion and orientation sensor, such as an inertial measurement unit (IMU), in order to acquire motion and/or orientation information associated with mobile device 19.

FIG. 2B depicts one embodiment of a portion of an HMD, such as mobile device 19 in FIG. 1. Only the right side of an HMD 200 is depicted. HMD 200 includes right temple 202, nose bridge 204, eye glass 216, and eye glass frame 214. Right temple 202 includes a capture device 213 (e.g., a front facing camera and/or microphone) in communication with processing unit 236. The capture device 213 may include one or more cameras for recording digital images and/or videos and may transmit the visual recordings to processing unit 236. The one or more cameras may capture color information, IR information, and/or depth information. The one or more cameras may include one or more image sensors (e.g., a CCD image sensor or a CMOS image sensor). The capture device 213 may also include one or more microphones for recording sounds and may transmit the audio recordings to processing unit 236.

Right temple 202 also includes biometric sensor 220, eye tracking system 221, ear phones 230, motion and orientation sensor 238, GPS receiver 232, power supply 239, and wireless interface 237, all in communication with processing unit 236. Biometric sensor 220 may include one or more electrodes for determining a pulse or heart rate associated with an end user of HMD 200 and a temperature sensor for determining a body temperature associated with the end user of HMD 200. In one embodiment, biometric sensor 220 includes a pulse rate measuring sensor which presses against the temple of the end user. Motion and orientation sensor 238 may include a three axis magnetometer, a three axis gyro, and/or a three axis accelerometer. In one embodiment, the motion and orientation sensor 238 may comprise an inertial measurement unit (IMU). The GPS receiver may determine a GPS location associated with HMD 200. Processing unit 236 may include one or more processors and a memory for storing computer readable instructions to be executed on the one or more processors. The memory may also store other types of data to be executed on the one or more processors.

In one embodiment, the eye tracking system 221 may include an inward facing camera. In another embodiment, the eye tracking system 221 may comprise an eye tracking illumination source and an associated eye tracking IR sensor. In one embodiment, the eye tracking illumination source may include one or more infrared (IR) emitters such as an infrared light emitting diode (LED) or a laser (e.g. VCSEL) emitting about a predetermined IR wavelength or a range of wavelengths. In some embodiments, the eye tracking sensor may include an IR camera or an IR position sensitive detector (PSD) for tracking glint positions. More information about eye tracking systems can be found in U.S. Pat. No. 7,401,920, entitled "Head Mounted Eye Tracking and Display System", issued Jul. 22, 2008, and U.S. patent application Ser. No. 13/245,700, entitled "Integrated Eye Tracking and Display System," filed Sep. 26, 2011, both of which are herein incorporated by reference.

In one embodiment, eye glass 216 may comprise a see-through display, whereby images generated by processing unit 236 may be projected and/or displayed on the see-through display. The capture device 213 may be calibrated such that a field of view captured by the capture device 213 corresponds with the field of view as seen by an end user of HMD 200. The ear phones 230 may be used to output sounds associated with the projected images of virtual objects. In some embodiments, HMD 200 may include two or more front facing cameras (e.g., one on each temple) in order to obtain depth from stereo information associated with the field of view captured by the front facing cameras. The two or more front facing cameras may also comprise 3D, IR, and/or RGB cameras. Depth information may also be acquired from a single camera utilizing depth from motion techniques. For example, two images may be acquired from the single camera associated with two different points in space at different points in time. Parallax calculations may then be performed given position information regarding the two different points in space.

In some embodiments, HMD 200 may perform gaze detection for each eye of an end user's eyes using gaze detection elements and a three-dimensional coordinate system in relation to one or more human eye elements such as a cornea center, a center of eyeball rotation, or a pupil center. Gaze detection may be used to identify where the end user is focusing within a field of view. Examples of gaze detection elements may include glint generating illuminators and sensors for capturing data representing the generated glints. In some cases, the center of the cornea can be determined based on two glints using planar geometry. The center of the cornea links the pupil center and the center of rotation of the eyeball, which may be treated as a fixed location for determining an optical axis of the end user's eye at a certain gaze or viewing angle.

Figure 3:
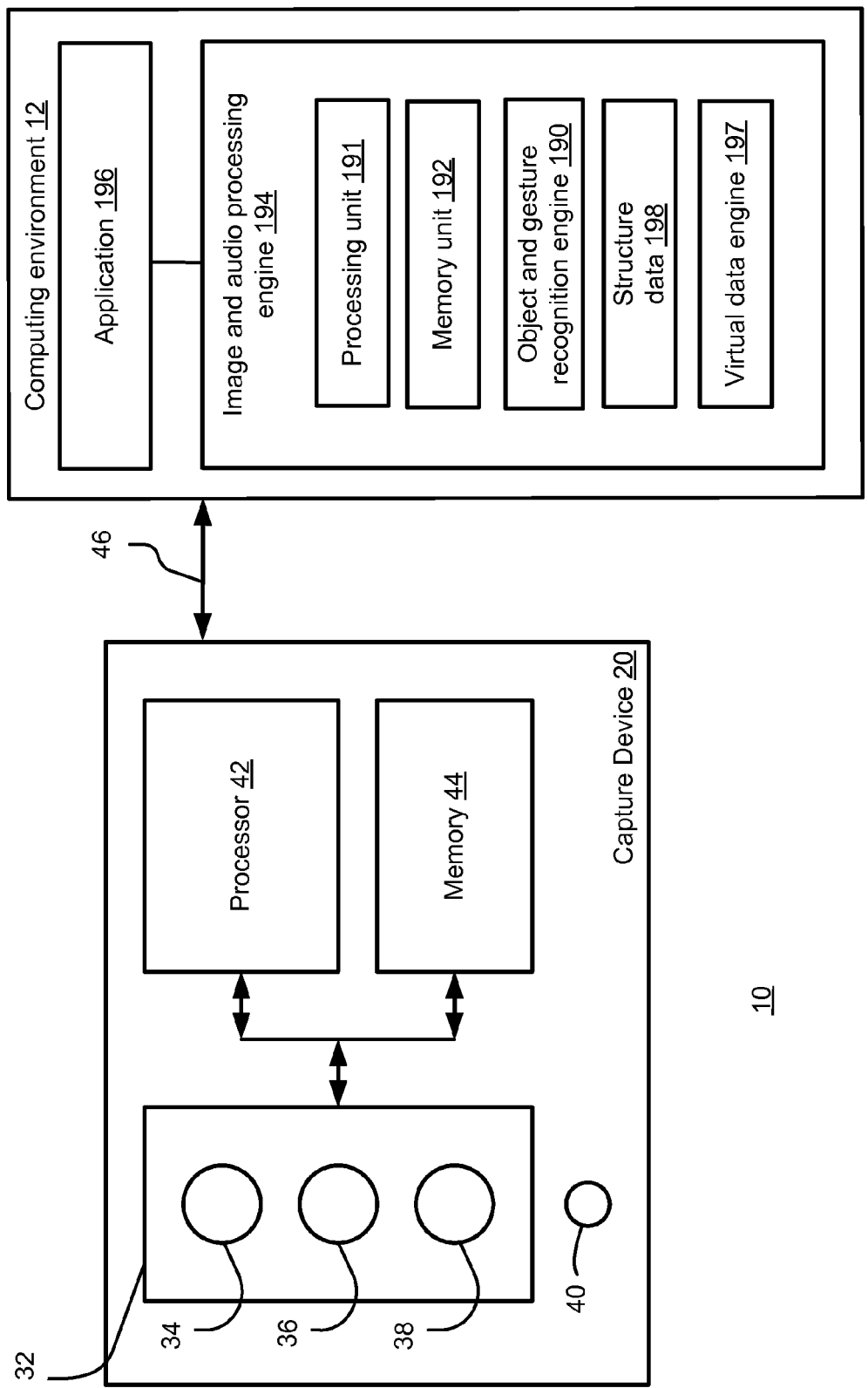
FIG. 3 depicts one embodiment of a computing system including a capture device and computing environment.

FIG. 3 depicts one embodiment of a computing system 10 including a capture device 20 and computing environment 12. In some embodiments, capture device 20 and computing environment 12 may be integrated within a single mobile computing device. The single integrated mobile computing device may comprise a mobile device, such as mobile device 19 in FIG. 1. In one example, the capture device 20 and computing environment 12 may be integrated within an HMD. In other embodiments, capture device 20 may be integrated with a first mobile device, such as mobile device 19 in FIG. 2A, and computing environment 12 may be integrated with a second mobile device in communication with the first mobile device, such as mobile device 5 in FIG. 2A.

In one embodiment, the capture device 20 may include one or more image sensors for capturing images and videos. An image sensor may comprise a CCD image sensor or a CMOS image sensor. In some embodiments, capture device 20 may include an image sensor and/or an IR CMOS image sensor. The capture device 20 may include an image camera component 32. The image camera component 32 may include an IR light component 34, a depth camera 36, and an RGB camera 38 that may be used to capture the depth image of a capture area. In one example, the IR light component 34 of the capture device 20 may emit an infrared light into the capture area and may then use sensors to detect the backscattered light from the surface of one or more objects in the capture area using the color and/or IR light sensing components within the image camera component 32. In some embodiments, pulsed infrared light may be used such that the time between an outgoing light pulse and a corresponding incoming light pulse may be measured and used to determine a physical distance from the capture device 20 to a particular location on the one or more objects in the capture area. Capture device 20 may also include optics for producing collimated light and/or for diffusing light (e.g., an optical diffuser for spreading light from an IR light source that generates a narrow beam of light) for illuminating an environment.

As depicted in FIG. 3, capture device 20 may include one or more microphones 40. Each of the one or more microphones 40 may include a transducer or sensor that may receive and convert sound into an electrical signal. The one or more microphones may comprise a microphone array in which the one or more microphones may be arranged in a predetermined layout.

The capture device 20 may include a processor 42 that may be in operative communication with the image camera component 32. The processor 42 may include a standardized processor, a specialized processor, a microprocessor, or the like. The processor 42 may execute instructions that may include instructions for receiving and analyzing images and/or determining whether a particular gesture has occurred (e.g., end user gestures for controlling or manipulating a virtual object). It is to be understood that at least some image analysis and/or gesture recognition operations may be executed by processors contained within one or more capture devices such as capture device 20.

The capture device 20 may include a memory 44 that may store the instructions that may be executed by the processor 42 and images (or frames of images) captured by the light sensing components of the image camera component 32. In one example, the memory 44 may include random access memory (RAM), read only memory (ROM), cache, Flash memory, a non-volatile memory, or any other suitable storage component. As depicted, the memory 44 may be a separate component in communication with the image capture component 32 and the processor 42. In another embodiment, the memory 44 may be integrated into the processor 42 and/or the image capture component 32. In other embodiments, some or all of the components 32, 34, 36, 38, 40, 42 and 44 of the capture device 20 may be housed in a single housing.

The capture device 20 may be in communication with the computing environment 12 via a communication link 46. The communication link 46 may be a wired connection or a wireless connection such as a wireless 802.11b, g, a, or n connection. In one embodiment, the capture device 20 may provide the images captured by, for example, the depth camera 36 and/or the RGB camera 38 to the computing environment 12 via the communication link 46.

As depicted in FIG. 3, computing environment 12 includes image and audio processing engine 194 in communication with application 196. Application 196 may comprise an operating system application or other computing application such as a gaming application, a messaging application, or an application for generating an augmented reality environment. Image and audio processing engine 194 includes virtual data engine 197, object and gesture recognition engine 190, structure data 198, processing unit 191, and memory unit 192, all in communication with each other. Image and audio processing engine 194 processes video, image, and audio data received from capture device 20. To assist in the detection and/or tracking of objects, image and audio processing engine 194 may utilize structure data 198 and object and gesture recognition engine 190.

Virtual data engine 197 processes virtual objects and registers the position and orientation of virtual objects in relation to various maps of a real-world environment stored in memory unit 192. The virtual data engine may also render images associated with virtual objects for display to an end user of computing system 10. In some embodiments, the computing system 10 may use images acquired from the capture device 20 to determine a six degree of freedom (6DOF) pose corresponding with the images relative to a 3D map of an environment. In one example, a 6DOF pose may comprise information associated with the position and orientation of a mobile device (e.g., an HMD) within the environment. The 6DOF pose may be used for localizing a mobile device and to generate images of virtual objects such that the virtual objects appear to exist at appropriate locations within an augmented reality environment. More information regarding determining a 6DOF pose can be found in U.S. patent application Ser. No. 13/152,220, "Distributed Asynchronous Localization and Mapping for Augmented Reality," incorporated herein by reference in its entirety. More information regarding performing pose estimation and/or localization for a mobile device can be found in U.S. patent application Ser. No. 13/017,474, "Mobile Camera Localization Using Depth Maps," incorporated herein by reference in its entirety.

Processing unit 191 may include one or more processors for executing object, facial, and voice recognition algorithms.

In one embodiment, image and audio processing engine 194 may apply object recognition and facial recognition techniques to image or video data. For example, object recognition may be used to detect particular objects (e.g., a pencil held by an end user of an HMD) and facial recognition may be used to detect the face of a particular person within an environment. Image and audio processing engine 194 may apply audio and voice recognition techniques to audio data. For example, audio recognition may be used to detect a particular sound. The particular faces, voices, sounds, and objects to be detected may be stored in one or more memories contained in memory unit 192. Processing unit 191 may execute computer readable instructions stored in memory unit 192 in order to perform processes discussed herein.

The image and audio processing engine 194 may utilize structural data 198 while performing object recognition. Structure data 198 may include structural information about targets and/or objects to be tracked. For example, a skeletal model of a human may be stored to help recognize body parts (e.g., arms, hands, and/or fingers). In another example, structure data 198 may include structural information regarding one or more inanimate objects in order to help recognize the one or more inanimate objects (e.g., a pencil or stylus).

The image and audio processing engine 194 may also utilize object and gesture recognition engine 190 while performing gesture recognition. In one example, object and gesture recognition engine 190 may include a collection of gesture filters, each comprising information concerning a gesture that may be performed. The object and gesture recognition engine 190 may compare the data captured by capture device 20 to the gesture filters in a gesture library to identify when a user has performed one or more gestures. In one example, image and audio processing engine 194 may use the object and gesture recognition engine 190 to detect the performance of a particular gesture performed by an end user of the computing system 10. In one embodiment, the object and gesture recognition engine 190 may utilize machine learning classification techniques.

FIGS. 4A-4D provide examples of various environments in which one or more virtual objects (e.g., a holographic poster or virtual alarm clock) may be generated and displayed to an end user of an HMD. The one or more virtual objects may comprise two-dimensional or three-dimensional virtual objects. In some cases, a virtual object may transition from a first two-dimensional space (e.g., corresponding with a surface of a desk) to a second two-dimensional space (e.g., corresponding with a wall within a particular room in a home) within an augmented reality environment based on positioning gestures performed by an end user of the HMD.

Figure 4A:
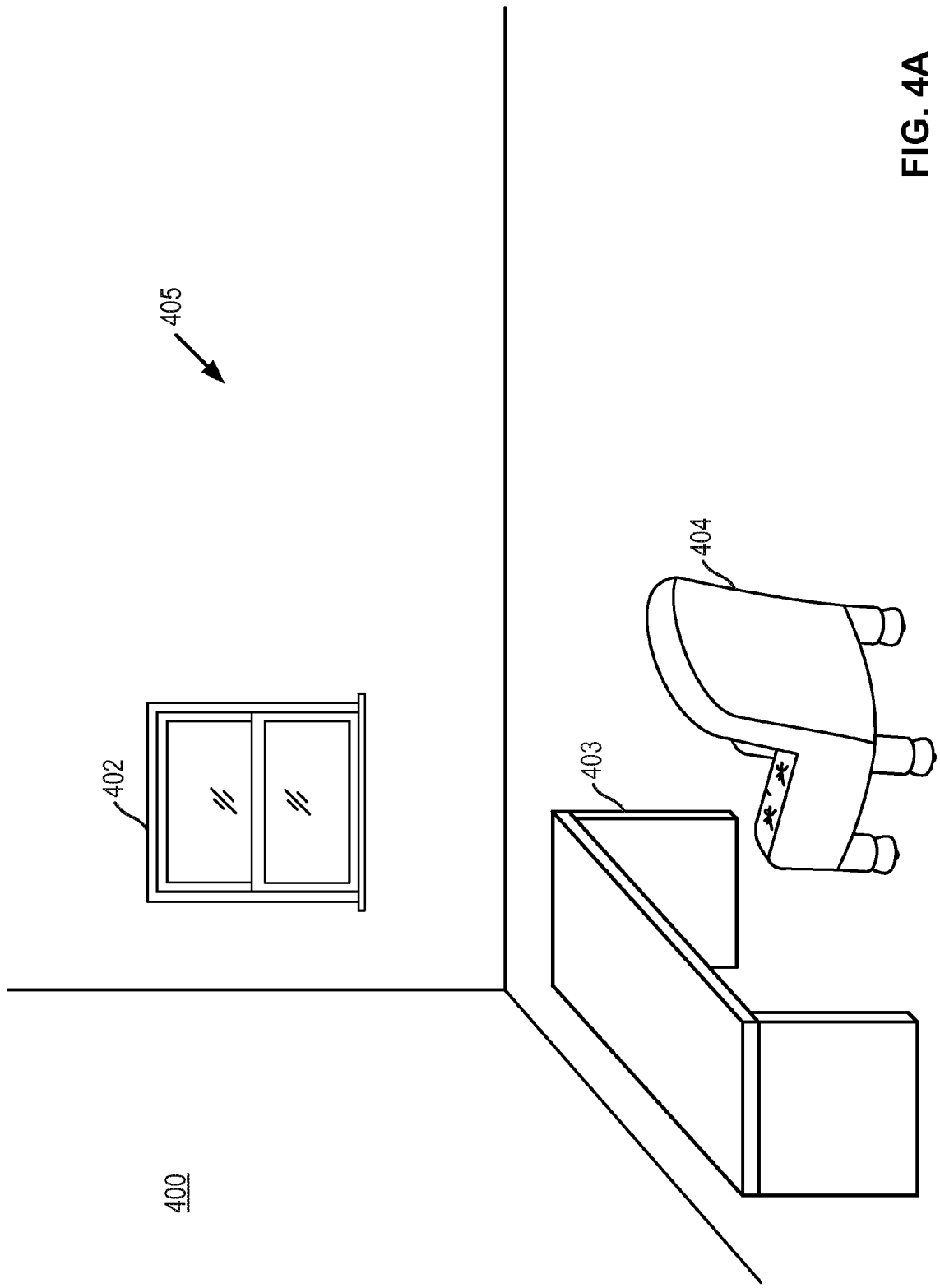
FIG. 4A depicts one embodiment of an environment in which one or more virtual objects may be positioned.

FIG. 4A depicts one embodiment of an environment 400 in which one or more virtual objects may be positioned. As depicted, environment 400 comprises a three-dimensional real-world space including a desk 403, chair 404, and window 402 within a wall 405. In one embodiment, the environment 400 comprises an office within a work environment.

Figure 4B:
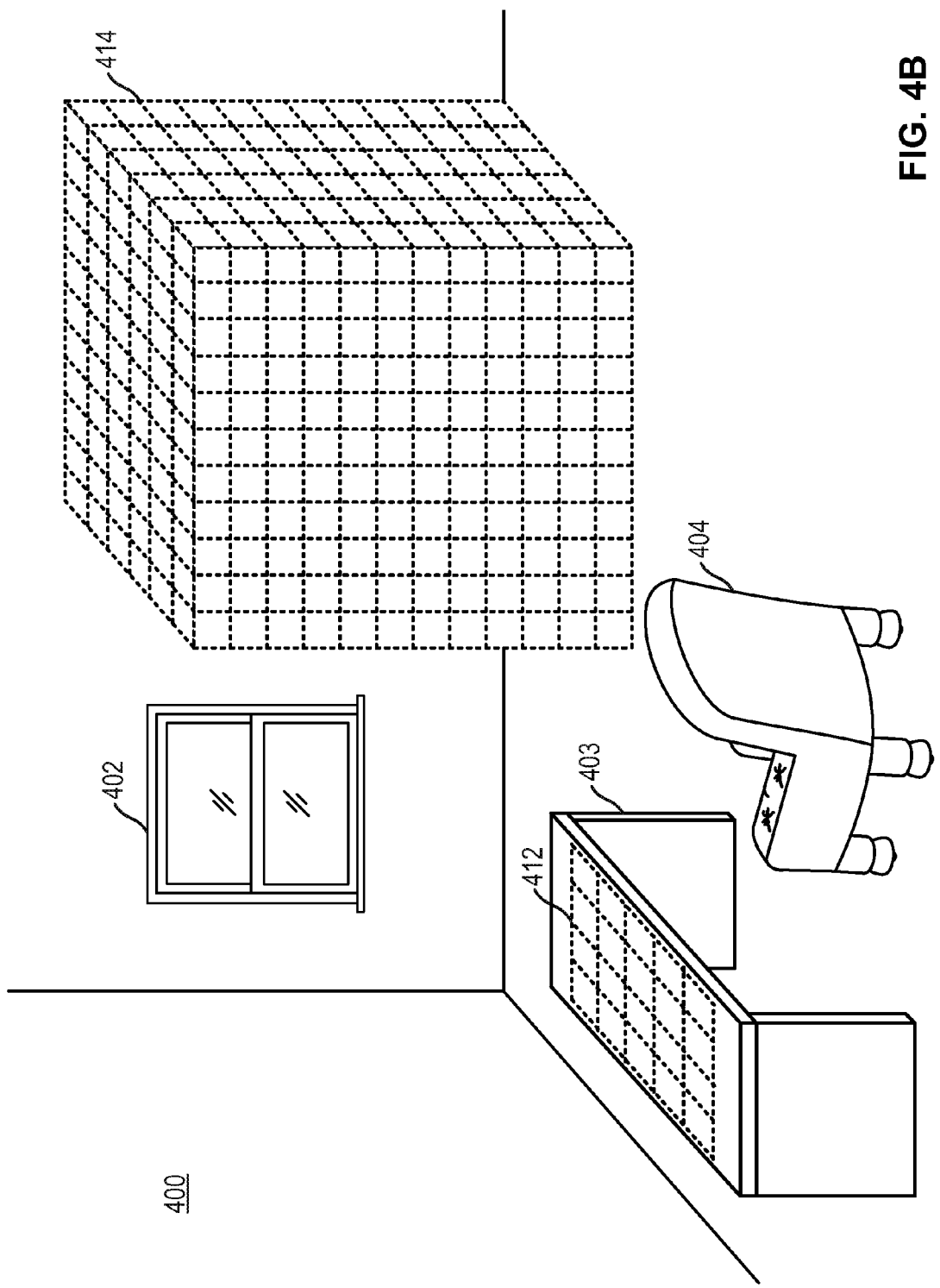
FIG. 4B depicts one embodiment of the environment in FIG. 4A including snap grid spaces.

FIG. 4B depicts one embodiment of the environment 400 in FIG. 4A including snap grid spaces. As depicted, a first snap grid space 414 comprises a three-dimensional grid space located within a portion of the three-dimensional real-world space and a second snap grid space 412 comprises a two-dimensional grid space located on the surface of a real-world object (i.e., the top surface of the desk 403). The snap grid spaces may be identified within an environment based on two-dimensional and three-dimensional open spaces within the environment. In one example, the first snap grid space 414 may be identified as a three-dimensional open space within environment 400 that satisfies volume requirements and/or space size requirements for the placement of virtual objects (e.g., a three-dimensional space larger than an eight foot by eight foot by eight foot cube). In another example, the second snap grid space 412 may be identified based on the recognition of the top surface of a particular desk (e.g., via object recognition of a particular person's desk within a work environment). Once one or more snap grid spaces (e.g., first snap grid space 414) have been identified within an augmented reality environment, the locations, orientations, and grid spacings associated with the one or more snap grid spaces may be stored as part of a three-dimensional map of the augmented reality environment.

Figure 4C:
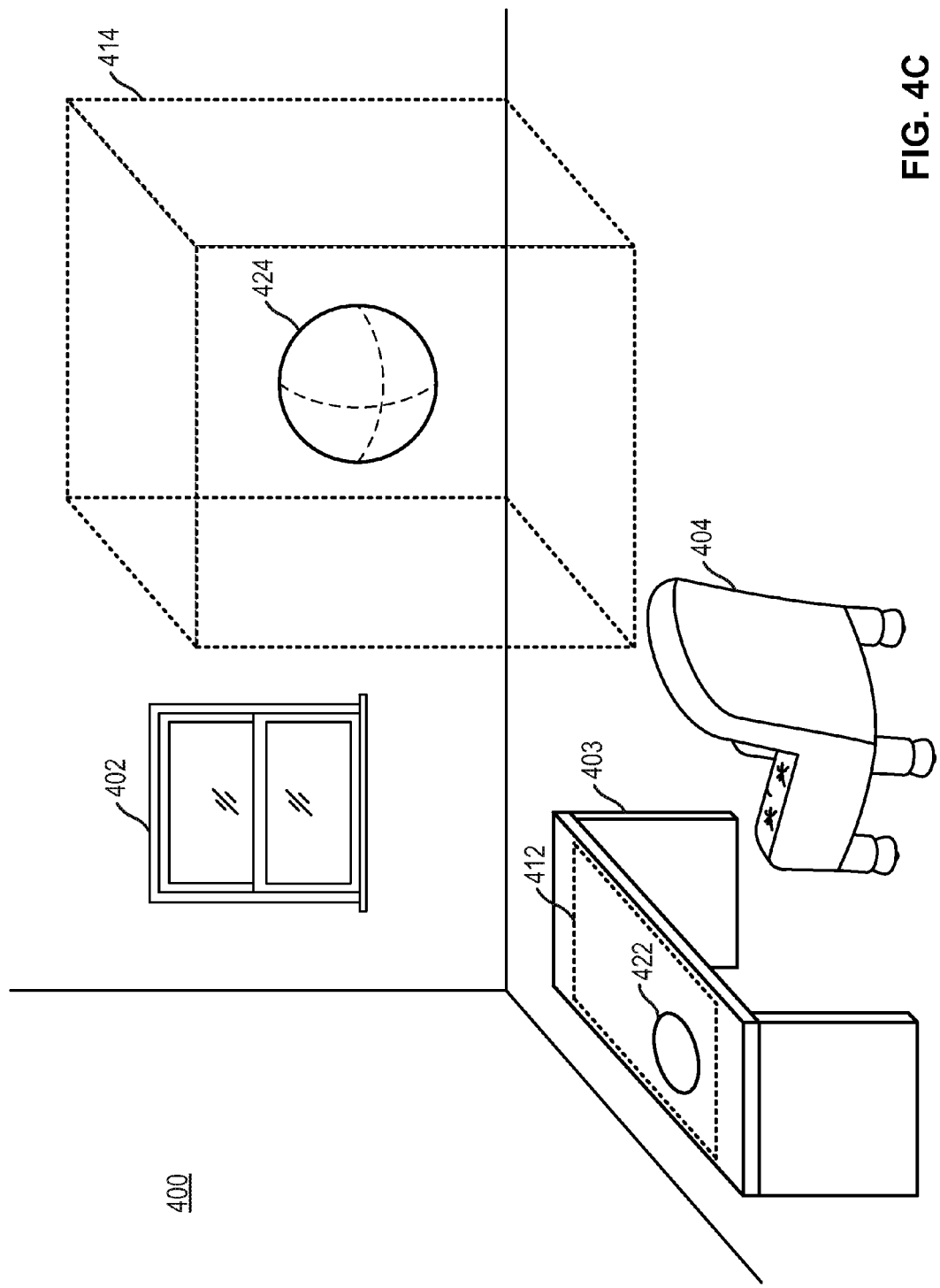
FIG. 4C depicts one embodiment of the environment in FIG. 4A including virtual objects placed into the snap grid spaces of FIG. 4B.

FIG. 4C depicts one embodiment of the environment 400 in FIG. 4A including virtual objects placed into the snap grid spaces of FIG. 4B. As depicted, a first virtual object 424 has been positioned within the first snap grid space 414. The first virtual object 424 may comprise a three-dimensional virtual object (e.g., a virtual ball). A second virtual object 422 has been positioned within the second snap grid space 412. The second virtual object 422 may comprise a two-dimensional virtual object (e.g., a virtual clock). In some cases, the second virtual object 422 may comprise a three-dimensional object with depth.

In some embodiments, the first virtual object 424 may be snapped (e.g., virtually magnetically snapped) to a closest grid point within the first snap grid space 414 (e.g., a center of the first virtual object may be positioned at the closest grid point) and the second virtual object 422 may be snapped to a closest grid point within the second snap grid space 412. The grid spacings associated with the first snap grid space 414 and the second snap grid space 412 may be determined based on virtual object applications running on the HMD (e.g., a virtual internet browsing application or a virtual basketball game application) and/or the size of the virtual objects located within a snap grid space relative to the size of the snap grid space. In some cases, the grid spacing associated with a snap grid space may be non-uniform within regions of the snap grid space (e.g., denser grid points may be provided near boundaries of the grid space). In one embodiment, a snap grid space may include a region of denser grid points where virtual objects are typically or routinely placed within the snap grid space.

In some embodiments, a snap grid space may comprise an adjustable and/or moveable virtual space. For example, a snap grid space that is attached to a work desk in a work environment may be moved to a different desk or surface within the work environment. In some cases, the snap grid space and its grid spacing may be adjusted (e.g., enlarged or shrunk by an end user of an HMD viewing the augmented reality environment) in order to fit within the dimensions of an anchoring real-world object (e.g., a desk) and/or virtual object (e.g., a virtual desk).

FIG. 4D depicts one embodiment of an augmented reality environment 401 including a first person 29 and a radial snap grid space 426 that is positioned relative to the first person 29. As depicted, the radial snap grid space 426 is positioned relative to the head of the first person 29 and a virtual object 425 (e.g., comprising a virtual sphere) is positioned relative to the radial snap grid space 426. In this case, as the first person 29 moves within the augmented reality environment, the radial snap grid 426 will move with the first person 29 and the virtual object 425 will move relative to the radial snap grid space 426. The first person 29 may comprise a moving anchor point for the radial snap grid space 426. In one embodiment, the first person 29 may comprise a person within the augmented reality environment 401 that is being viewed by an end user of an HMD. In another embodiment, the first person 29 may comprise an end user of an HMD and the radial snap grid 426 may correspond with a location of the HMD (e.g., a nose bridge of the HMD, such as nose bridge 204 in FIG. 2B). In some cases, the radial snap grid 426 may be positioned relative to a body part of a person's body (e.g., a top of the person's head or a center of the person's chest). Although a radial snap grid space is depicted, other snap grid regions may also be used. For example, a cubic snap grid space may be positioned relative to the head (or other body part) of the first person 29 and a virtual object may be positioned relative to the cubic snap grid space.

Figure 5A:
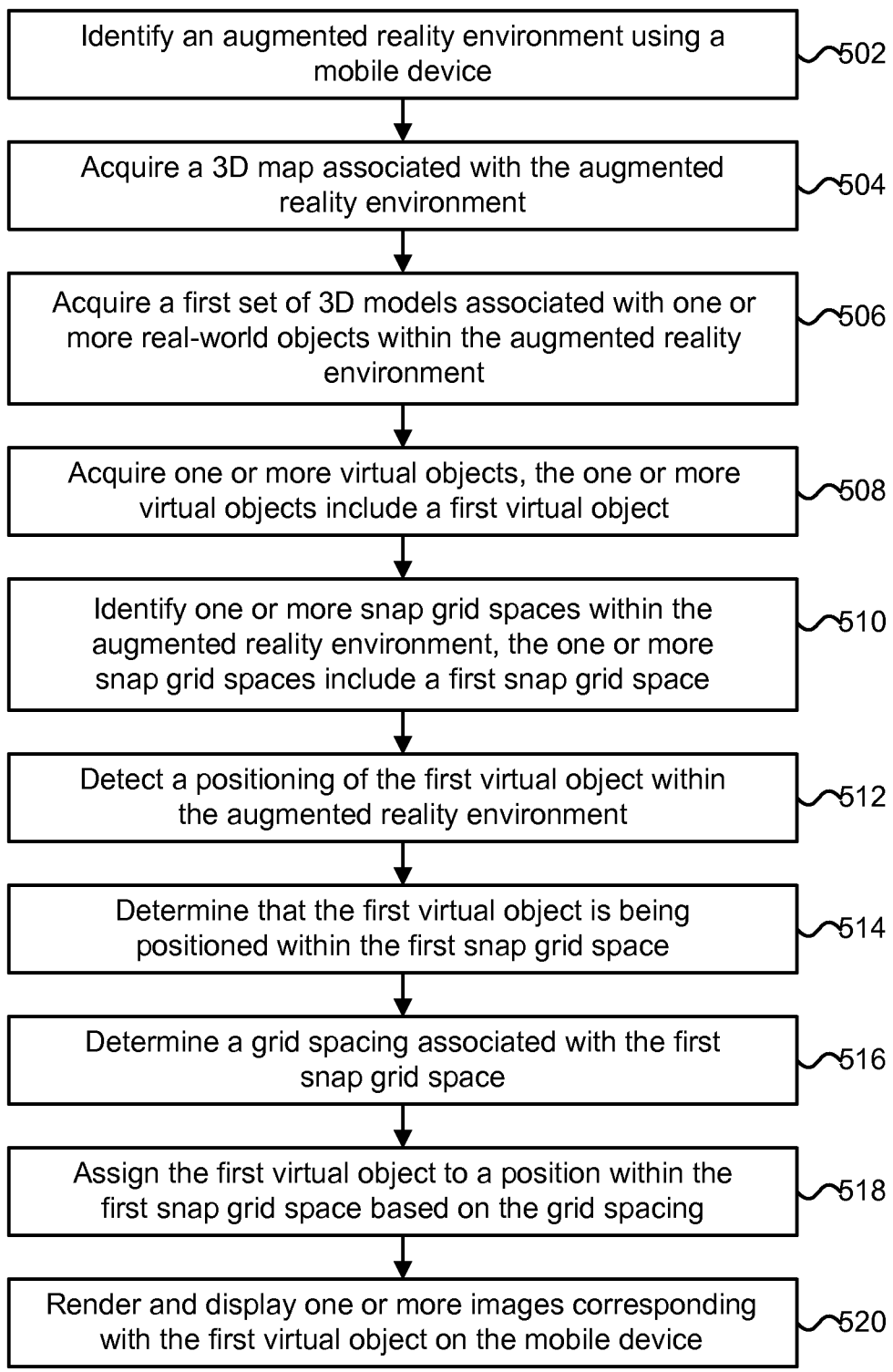
FIG. 5A is a flowchart describing one embodiment of a method for positioning virtual objects within an augmented reality environment using snap grid spaces.

FIG. 5A is a flowchart describing one embodiment of a method for positioning virtual objects within an augmented reality environment using snap grid spaces. In one embodiment, the process of FIG. 5A may be performed by a mobile device, such as mobile device 19 in FIG. 1.

In step 502, an augmented reality environment is identified using a mobile device. The mobile device may comprise an HMD. The augmented reality environment may be identified via GPS coordinates or via image recognition of particular features or landmarks within a real-world environment. Images of the real-world environment associated with the augmented reality environment may be captured using a capture device, such as capture device 20 in FIG. 3. In one example, the real-world environment may comprise a home or a bedroom or living room within the home.

In step 504, a 3D map associated with the augmented reality environment is acquired. The 3D map may correspond with a real-world coordinate system associated with the augmented reality environment. The 3D map may include models of various landmarks or other environmental features associated with the environment. The 3D map may comprise a top-level world space and object spaces located within the top-level world space. In one embodiment, the 3D map may correspond with a room, such as environment 400 in FIG. 4A.

In step 506, a first set of 3D models associated with one or more real-world objects within the augmented reality environment is acquired. Each of the first set of 3D models may correspond with a real-world object identified within the augmented reality environment. The real-world objects within the augmented reality environment may be identified via object and/or image recognition techniques. In one embodiment, the first set of 3D models may include a first model associated with a worktable or desk, such as desk 403 in FIG. 4A.

In step 508, one or more virtual objects are acquired. The one or more virtual objects may be acquired from a virtual object server, such as server 15 in FIG. 1. The one or more virtual objects may comprise virtual objects that have already been placed within the augmented reality environment and/or virtual objects that may be placed into the augmented reality environment at a future time. The one or more virtual objects may include a first virtual object. In one embodiment, the first virtual object comprises a three-dimensional virtual ball, such as first virtual object 424 in FIG. 4C.

In step 510, one or more snap grid spaces are identified within the augmented reality environment. The one or more snap grid spaces may include a first snap grid space. The first snap grid space may comprise a two-dimensional grid space, such as second snap grid space 412 in FIG. 4B, or a three-dimensional grid space, such as first snap grid space 414 in FIG. 4B. In some embodiments, the one or more snap grid spaces may be identified within the augmented reality environment via object and/or image recognition techniques in order to detect suitable open spaces. The one or more snap grid spaces may also be identified as part of the 3D map associated with the augmented reality environment. One embodiment of a process for identifying snap grid spaces within an augmented reality environment is described later in reference to FIG. 5B.

In step 512, the positioning of the first virtual object within the augmented reality environment is detected. In one embodiment, the positioning of the first virtual object may be detected by recognizing a virtual object positioning gesture performed by an end user of the mobile device. In step 514, it is determined that the first virtual object is being positioned within the first snap grid space. In one embodiment, the first virtual object may be deemed to be within the first snap grid space if an overlap of the first virtual object with the first snap grid space occurs within a field of view of a mobile device. In another embodiment, the first virtual object may be deemed to be within the first snap grid space if a three-dimensional position associated with the first virtual object is within the first snap grid space. One embodiment of a process for determining that a virtual object is being positioned within a snap grid space is described later in reference to FIG. 5C.

In step 516, a grid spacing associated with the first snap grid space is determined. In one embodiment, the grid spacing (or density of grid points) associated with the snap grid space may be determined based on applications running on the mobile device (e.g., a virtual TV viewing application or a virtual web browsing application that utilizes virtual objects within an augmented reality environment) and/or the size of the virtual object relative to the size of the snap grid space (e.g., a smaller virtual object may require a higher grid spacing density as compared with a larger virtual object). In one example, an application running a virtual TV application may allow an end user of an HMD to view channels and/or broadcasts on a virtual TV located within the augmented reality environment (i.e., the same channels and/or broadcasts that would be available on a real TV). In another example, an augmented reality application may manage one or more virtual tiles (e.g., computing application icons, electronic file icons, or file directory icons) and the grid spacing may be set based on a tile size associated with the one or more virtual tiles. The grid spacing may be set such that the tile size is an integer multiple of the grid spacing.

In some cases, the grid spacing may be set based on the size of other virtual objects that have already been positioned within (or relative to) the snap grid space. In one example, the grid spacing may be set based on the smallest virtual object positioned within the snap grid space. In some cases, the grid spacing may be non-uniform within regions of the snap grid space (e.g., denser grid points may be provided near corners or edges of the grid space or within regions of the grid space in which positioning of virtual objects has been found to repeatedly occur).

In one embodiment, the grid spacing associated with the first snap grid space may be determined based on a size of a first virtual object and a size of the first snap grid space. In one example, if a holographic wall clock is placed on a wall, then a one meter snap grid may be used. In another example, if a table clock that is smaller than the wall clock is placed on a desk, then a one centimeter snap grid (or other grid spacing less than the grid spacing used for the larger wall clock) may be used. Although an initial grid spacing (or snap grid unit scale) may be determined based on various inputs such as a size of the first virtual object, a size of the first snap grid space, the size of the first virtual object relative to the size of the first snap grid space, the sizes of other virtual objects that have already been positioned within (or relative to) the first snap grid space, characteristics of the room into which the first virtual object will be placed (e.g., the dimensions of the room and/or the amount of open space within the room), user preferences, and/or requirements of an augmented reality application generating the first virtual object, an end user of a mobile device may adjust the grid spacing to suit their needs over time. For example, the grid spacing of the first snap grid may be resized or adjusted (e.g., enlarged or shrunk by an end user of an HMD viewing the augmented reality environment) in order to fit within the dimensions of an anchoring real-world object and/or an anchoring virtual object.

In some cases, the grid spacing may be determined based on the precision of the tracking angular resolution of the mobile device providing the augmented reality environment (e.g., an HMD). For example, if the mobile device can only detect movements greater than one degree movements of the end user's head (or eyes), then the grid spacing may be set to a minimum resolvable spacing associated with the tracking angular resolution.

In step 518, the first virtual object is assigned to a position within the first snap grid space based on the grid spacing. In one embodiment, the first virtual object may be snapped to the closest grid point within the first snap grid space. In one example, a first point (e.g., a center point) of the first virtual object may be snapped to the closest grid point within the first snap grid space. In some cases, the first virtual object may snap its position and orientation relative to a set of grid points (or anchor points) within the first snap grid space. In step 520, one or more images corresponding with the first virtual object are rendered and displayed on the mobile device. The one or more images corresponding with the first virtual object may be rendered and displayed such that the first virtual object is perceived to exist within the environment at a point in space corresponding with the position within the first snap grid space.

Figure 5B:
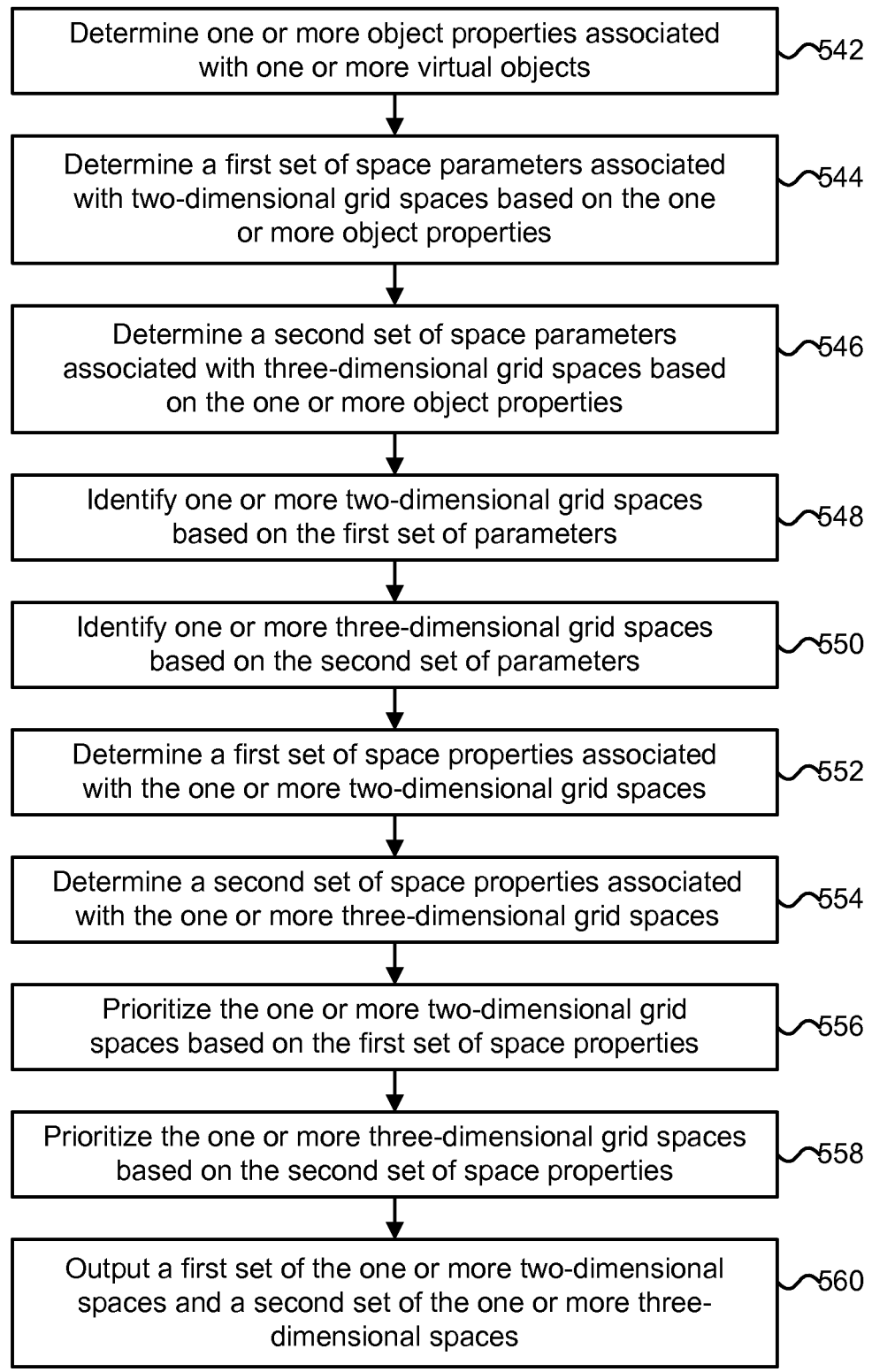
FIG. 5B is a flowchart describing one embodiment of a process for identifying snap grid spaces within an augmented reality environment.

FIG. 5B is a flowchart describing one embodiment of a process for identifying snap grid spaces within an augmented reality environment. The process described in FIG. 5B is one example of a process for implementing step 510 in FIG. 5A. In one embodiment, the process of FIG. 5B may be performed by a mobile device, such as mobile device 19 in FIG. 1.

In step 542, one or more object properties associated with one or more virtual objects are determined. The one or more object properties may include properties regarding the size of a virtual object, the dimensionality of a virtual object (e.g., whether the virtual object is a two-dimensional object or a three-dimensional object), and a location snap point associated with a virtual object (e.g., a center point of the virtual object or other reference point associated with the virtual object for positioning the virtual object within an augmented reality environment).

In step 544, a first set of space parameters associated with two-dimensional grid spaces is determined based on the one or more object properties. The first set of space parameters may specify a minimum area, a maximum area, and dimensional requirements (e.g., that a two-dimensional grid space be wider than two meters in one of the dimensions). In step 546, a second set of space parameters associated with three-dimensional grid spaces is determined based on the one or more object properties. The second set of space parameters may specify a minimum volume, a maximum volume, and dimensional requirements (e.g., that a three-dimensional grid space be greater than three meters in one of the dimensions).

In step 548, one or more two-dimensional grid spaces are identified based on the first set of parameters. In step 550, one or more three-dimensional grid spaces are identified based on the second set of parameters. The one or more two-dimensional grid spaces and the one or more three-dimensional grid spaces may be identified using a 3D map associated with an augmented reality environment and/or 3D models associated with real-world objects detected within the augmented reality environment.

In step 552, a first set of space properties associated with the one or more two-dimensional grid spaces is determined. The first set of space properties may include sizes of the grid spaces identified. In step 554, a second set of space properties associated with the one or more three-dimensional grid spaces is determined. The second set of space properties may include sizes of the grid spaces identified. In step 556, the one or more two-dimensional grid spaces are prioritized based on the first set of space properties. The one or more two-dimensional grid spaces may be ordered based on their areas and/or dimension sizes. In step 558, the one or more three-dimensional grid spaces are prioritized based on the second set of space properties. The one or more three-dimensional grid spaces may be ordered based on their areas and/or dimension sizes.

In step 560, a first set of the one or more two-dimensional spaces and a second set of the one or more three-dimensional spaces may be outputted. In one embodiment, the first set of the one or more two-dimensional spaces may comprise grid spaces with areas less than a maximum area and greater than a minimum area within an augmented reality environment. The second set of the one or more three-dimensional spaces may comprise grid spaces with volumes less than a maximum volume and greater than a minimum volume within the augmented reality environment.

Figure 5C:
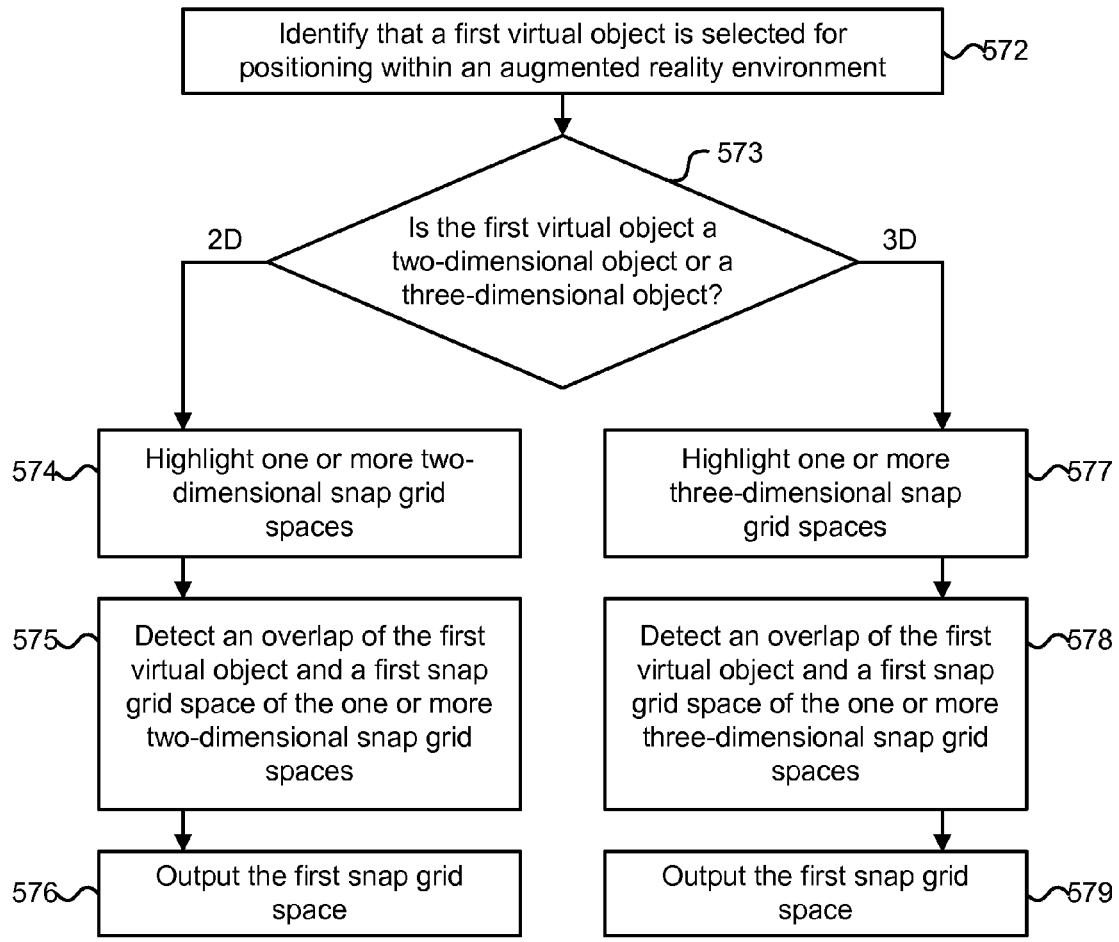
FIG. 5C is a flowchart describing one embodiment of a process for determining that a virtual object is being positioned within a snap grid space.

FIG. 5C is a flowchart describing one embodiment of a process for determining that a virtual object is being positioned within a snap grid space. The process described in FIG. 5C is one example of a process for implementing step 514 in FIG. 5A. In one embodiment, the process of FIG. 5C may be performed by a mobile device, such as mobile device 19 in FIG. 1.

In step 572, it is identified that a first virtual object is selected for positioning within an augmented reality environment. A virtual object may be selected for positioning if an end user of an HMD performs a gesture that triggers a positioning event such as a virtual object move function or a virtual object cut-and-paste function. In step 573, it is determined whether the first virtual object is a two-dimensional object or a three-dimensional object. If the virtual object is a two-dimensional object, then step 574 is performed. Otherwise, if the first virtual object is a three-dimensional object, then step 577 is performed.

In one embodiment, if the first virtual object is a two-dimensional virtual object, then only two-dimensional snap grid spaces may be identified and/or highlighted to an end user of an HMD. If the first virtual object is a three-dimensional virtual object, then only three-dimensional snap grid spaces may be identified and/or highlighted to an end user of an HMD.

In step 574, one or more two-dimensional snap grid spaces are highlighted within the augmented reality environment. In some cases, only the two-dimensional snap grid spaces that are able to contain or otherwise position the first virtual object within them may be highlighted. In one embodiment, each of the one or more two-dimensional snap grid spaces may be highlighted by placing a highlighting box and/or a highlighting color over each of the one or more two-dimensional snap grid spaces. In some embodiments, a subset of the one or more two-dimensional snap grid spaces may be highlighted if the first virtual object is within a proximity of the subset or overlaps with the subset. The highlighting may comprise projecting a virtual wireframe mesh or virtual point grid of snap points over the subset of the one or more two-dimensional snap grid spaces. In step 575, an overlap of the first virtual object and a first snap grid space of the one or more two-dimensional snap grid spaces is detected. In step 576, the first snap grid space is outputted. The first snap grid may be outputted upon a virtual object release gesture performed by an end user of an HMD.

In step 577, one or more three-dimensional snap grid spaces are highlighted within the augmented reality environment. In some cases, only the three-dimensional snap grid spaces that are able to contain or otherwise position the first virtual object within them may be highlighted. In one embodiment, each of the one or more three-dimensional snap grid spaces may be highlighted by placing a highlighting cube and/or a highlighting color over each of the one or more three-dimensional snap grid spaces. In some embodiments, a subset of the one or more three-dimensional snap grid spaces may be highlighted if the first virtual object is within a proximity of the subset or overlaps with the subset. The highlighting may comprise projecting a virtual wireframe mesh or virtual point grid of snap points over the subset of the one or more three-dimensional snap grid spaces. In step 578, an overlap of the first virtual object and a first snap grid space of the one or more three-dimensional snap grid spaces is detected. In step 579, the first snap grid space is outputted. The first snap grid may be outputted upon a virtual object release gestures performed by an end user of an HMD.

One embodiment of the disclosed technology includes a see-through display in communication with the one or more processors. The one or more processors acquire one or more virtual objects associated with the augmented reality environment. The one or more virtual objects include a first virtual object. The one or more processors identify one or more snap grid spaces within the augmented reality environment. The one or more snap grid spaces include a first snap grid space. The one or more processors determine a grid spacing associated with the first snap grid space based on one or more properties of the first virtual object, and assign the first virtual object to a position within the first snap grid space based on the grid spacing. The see-through display displays one or more images such that the first virtual object is perceived to exist within the augmented reality environment at the position within the first snap grid space.

One embodiment of the disclosed technology includes acquiring one or more virtual objects associated with the augmented reality environment. The one or more virtual objects include a first virtual object. The method further comprises identifying one or more snap grid spaces within the augmented reality environment. The one or more snap grid spaces include a first snap grid space. The method further comprises determining a grid spacing associated with the first snap grid space based on one or more properties of the first virtual object, assigning the first virtual object to a position within the first snap grid space based on the grid spacing, rendering one or more images corresponding with the first virtual object at the position within the first snap grid space, and displaying the one or more images on a mobile device.

One embodiment of the disclosed technology includes acquiring one or more virtual objects associated with the augmented reality environment. The one or more virtual objects include a first virtual object. The method further comprises determining a dimensionality of the first virtual object and identifying one or more snap grid spaces within the augmented reality environment based on the dimensionality of the first virtual object. The one or more snap grid spaces include a first snap grid space. The method further comprises determining a grid spacing associated with the first snap grid space based on one or more properties of the first virtual object, snapping the first virtual object to a position within the first snap grid space based on the grid spacing, rendering one or more images corresponding with the first virtual object at the position within the first snap grid space, and displaying the one or more images on a mobile device.

Figure 6:
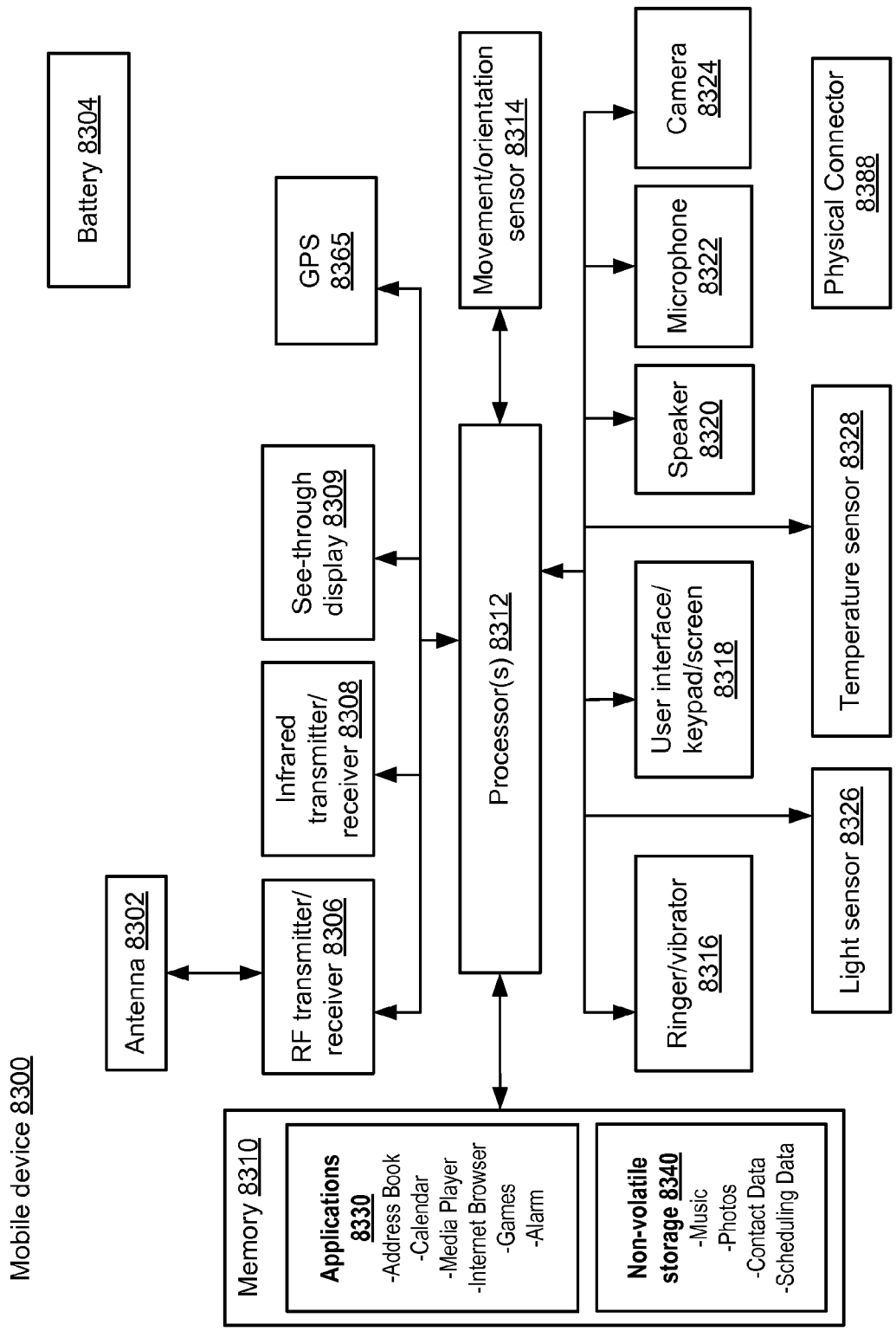
FIG. 6 is a block diagram of one embodiment of a mobile device.

FIG. 6 is a block diagram of one embodiment of a mobile device 8300, such as mobile device 19 in FIG. 1. Mobile devices may include laptop computers, pocket computers, mobile phones, HMDs, personal digital assistants, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 are in communication with a see-through display 8309. The see-through display 8309 may display one or more virtual objects associated with a real-world environment. The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An electronic device for generating an augmented reality environment, comprising:
one or more processors, the one or more processors determine a plurality of virtual objects that are positioned within the augmented reality environment, the plurality of virtual objects includes a first virtual object, the one or more processors identify a first snap grid space within the augmented reality environment, the one or more processors determine that the first virtual object is the smallest virtual object of the plurality of virtual objects, the one or more processors automatically determine a grid spacing associated with the first snap grid space based on a size of the first virtual object in response to determining that the first virtual object is the smallest virtual object of the plurality of virtual objects that are positioned within the augmented reality environment, the one or more processors automatically determine the grid spacing without intervention by an end user of the electronic device, the plurality of virtual objects comprises virtual objects of at least two different sizes; and a see-through display in communication with the one or more processors, the see-through display displays one or more images such that the first virtual object is perceived to exist within the augmented reality environment at a position within the first snap grid space.

2. The electronic device of claim 1, wherein:
the one or more processors automatically determine the grid spacing based on the size of the first virtual object relative to a size of the first snap grid space.

3. The electronic device of claim 1, wherein:
the one or more processors determine a dimensionality of the first virtual object, the one or more processors identify the first snap grid space within the augmented reality environment based on the dimensionality of the first virtual object.

4. The electronic device of claim 1, wherein:
the first snap grid space comprises a three-dimensional space within the augmented reality environment, the first virtual object comprises a three-dimensional virtual object, the electronic device comprises a head-mounted display device.

5. The electronic device of claim 1, wherein:
the first snap grid space comprises a radial snap grid space that is positioned relative to a person within the augmented reality environment.

6. A method for positioning virtual objects within an augmented reality environment, comprising:
determining a plurality of virtual objects that are positioned within the augmented reality environment, the plurality of virtual objects includes a first virtual object;
identifying a first snap grid space within the augmented reality environment;
determining that the first virtual object is the smallest virtual object of the plurality of virtual objects;
automatically determining a grid spacing associated with the first snap grid space based on a size of the first virtual object in response to determining that the first virtual object is the smallest virtual object of the plurality of virtual objects, the plurality of virtual objects comprises virtual objects of at least two different sizes;
rendering one or more images corresponding with the first virtual object at a position within the first snap grid space; and
displaying the one or more images on a mobile device, the automatically determining a grid spacing associated with the first snap grid space includes automatically determining the grid spacing without intervention by an end user of the mobile device.

7. The method of claim 6, wherein:
the automatically determining a grid spacing associated with the first snap grid space includes automatically determining the grid spacing based on the size of the first virtual object relative to a size of the first snap grid space.

8. The method of claim 6, further comprising:
determining a dimensionality of the first virtual object, the identifying a first snap grid space within the augmented reality environment includes identifying the first snap grid space based on the dimensionality of the first virtual object.

9. The method of claim 6, wherein:
the first snap grid space comprises a two-dimensional space within the augmented reality environment, the first virtual object comprises a two-dimensional virtual object.

10. The method of claim 6, wherein:
the first snap grid space comprises a three-dimensional space within the augmented reality environment, the first virtual object comprises a three-dimensional virtual object.

11. The method of claim 6, further comprising:
relocating the first snap grid space within the augmented reality environment prior to the rendering one or more images.

12. The method of claim 6, further comprising:
resizing the first snap grid space within the augmented reality environment prior to the rendering one or more images.

13. The method of claim 6, wherein:
the first snap grid space includes a non-uniform distribution of snap grid points.

14. The method of claim 6, wherein:
the mobile device comprises a head-mounted display device.

15. The method of claim 6, wherein:
the rendering one or more images is performed by the mobile device.

16. One or more storage devices containing processor readable code for programming one or more processors to perform a method for positioning virtual objects within an augmented reality environment comprising the steps of:
determining a plurality of virtual objects that are positioned within the augmented reality environment, the plurality of virtual objects includes a first virtual object;
determining a dimensionality of the first virtual object;
identifying a first snap grid space within the augmented reality environment based on the dimensionality of the first virtual object;
determining that the first virtual object is the smallest virtual object of the plurality of virtual objects;
automatically determining a grid spacing associated with the first snap grid space based on a size of the first virtual object in response to determining that the first virtual object is the smallest virtual object of the plurality of virtual objects, the plurality of virtual objects comprises virtual objects of at least two different sizes;
rendering one or more images corresponding with the first virtual object at a position within the first snap grid space; and
displaying the one or more images on a mobile device, the automatically determining a grid spacing associated with the first snap grid space includes automatically determining the grid spacing without intervention by an end user of the mobile device.

17. The one or more storage devices of claim 16, wherein:
the automatically determining a grid spacing associated with the first snap grid space includes automatically determining the grid spacing based on the size of the first virtual object relative to a size of the first snap grid space.

* * * * *